Aug. 12, 1969     L. O. STINE ET AL     3,461,063
HYDROGENATION PROCESS
Filed April 4, 1966
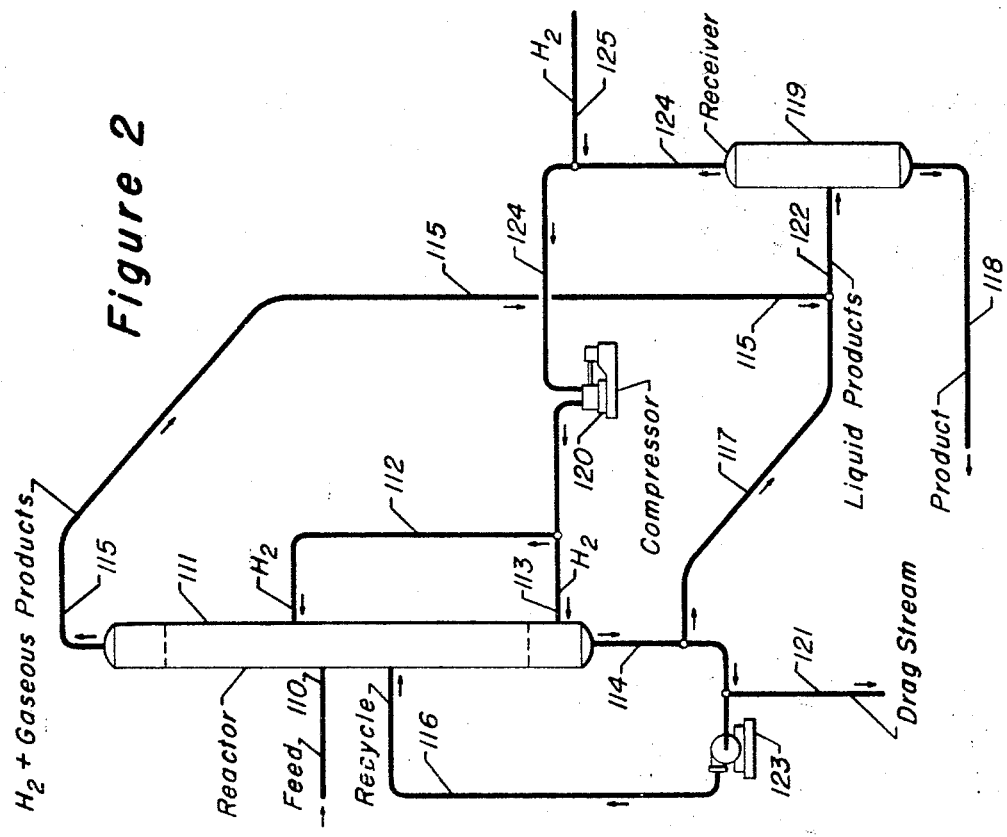
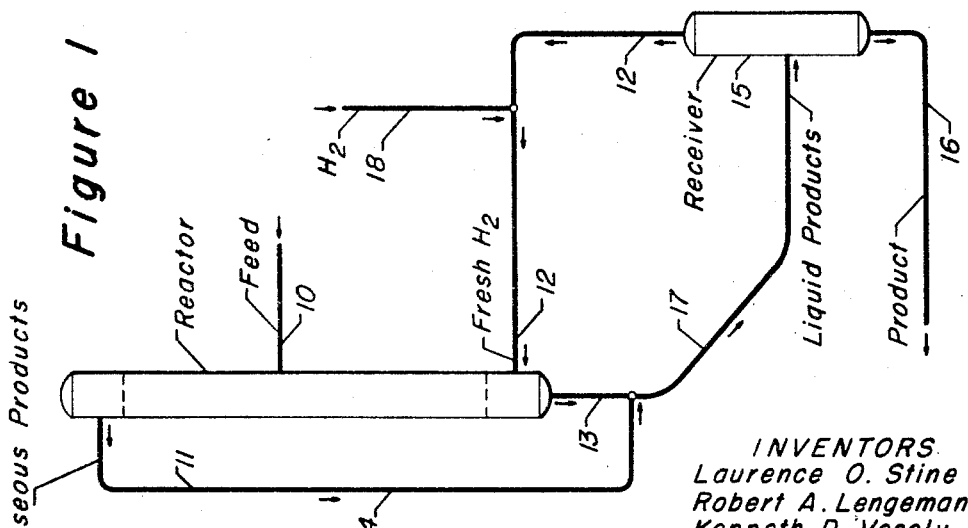
INVENTORS
Laurence O. Stine
Robert A. Lengemann
Kenneth D. Vesely
BY: James R. Hoatson Jr.
Joseph C. Mason Jr.
ATTORNEYS

United States Patent Office 3,461,063
Patented Aug. 12, 1969

3,461,063
HYDROGENATION PROCESS
Laurence O. Stine, Western Springs, Robert A. Lengemann, Arlington Heights, and Kenneth Donald Vesely, La Grange Park, Ill., assignors to Universal Oil Products Company, Des Plaines, Ill., a corporation of Delaware
Filed Apr. 4, 1966, Ser. No. 539,883
Int. Cl. C10g 23/00
U.S. Cl. 208—143                                 3 Claims

ABSTRACT OF THE DISCLOSURE

Process for hydrogenating hydrocarbon oils wherein the feedstock is contacted in a mixed liquid-vapor phase with a stationary bed of granular solid hydrogenation catalyst in the presence of hydrogen-containing gas.

---

This invention relates to a hydrogenation process. It particularly relates to a process for hydrogenating hydrocarbon oils containing unsaturated and/or sulfur-containing constituents. It especially relates to an improved manner in conducting processes wherein hydrocarbon materials are contacted in mixed liquid-vapor phase with a stationary bed of granular solid catalyst in the presence of hydrogen-containing gas.

It is known in the art to contact hydrocarbon materials with hydrogen in the presence of a catalyst by passing the hydrogen and hydrocarbon materials through a stationary bed of solid catalyst. Generally, for improved operation, the oil to be treated is in the vapor phase in order to achieve a relatively high rate of reaction and to materially decrease the deactivation rate of the catalyst. However, the vapor phase operation requires an extremely large amount of hydrogen, i.e. 3,000 to 10,000 standard cubic feet per barrel of oil for effective desulfurization of an oil, in order to achieve satisfactory hydrogenating efficiency.

The prior art has also suggested that hydrogenation of hydocarbon oil be accomplished in liquid phase, such as by filling a reactor containing a catalyst with liquid hydrocarbon and the bubbling hydrogen gas through the liquid phase. However, in this type of process, it was found that the reaction rate was exorbitantly low, and was a practical mode of operation only if very mild hydrogenation of the oil was desired.

The major disadvantages to the prior art process have been minimized, in general, by changing the process conditions so that the amount of hydrogen in contact with the oil is substantially increased; such as by increasing the hydrogen flow rate using the well known recycle-hydrogen technique, and/or by decreasing the oil flow rate such that the oil will pass over the catalyst in thin flowing films of oil. It was additionally found, however, that in the prior art processing schemes as the amount of hydrocarbon in contact with the catalyst bed increases, the catalyst activity generally decreases. This effect is at least partially a result of the fact that the desired hydrogenation and/or other reactions often are catalyzed at a temperature above the decomposition point for certain hydrocarbon constituents in the feed stock. Accordingly, such operation tended to coke the catalyst pores and thereby contributed to a gradual deactivation of the catalyst.

It is an object of the present invention to provide an improved process for the hydrogen treatment of certain constituents in hydrocarbon mixtures. It is another object to provide an improved process whereby hydrogenation is carried out simultaneously in both liquid and vapor phases. It is still another object of the present invention to provide an improved process for hydrogenating hydrocarbon oils which causes less catalyst deactivation than heretofore thought possible. These and other objects of the invention will become apparent to those skilled in the art from the ensuing description of the invention and the appended drawings of which:

FIGURE 1 represents a simplified schematic flow diagram showing one embodiment of the invention, and
FIGURE 2 represents a schematic flow diagram showing a specific embodiment of the invention.

According to the present invention, the hydrogenating of certain constituents in hydrocarbon mixtures is performed by a process which comprises introducing a hydrocarbon mixture into a bed of granular solid hydrogenating catalyst under hydrogenating conditions at a locus intermediate the ends of said bed, passing a portion of the hydrocarbon mixture downwardly in primarily liquid phase through that section of said bed below the feed locus, passing the remaining portion of said mixture upwardly in primarily vapor phase through that section of said bed above the locus, passing hydrogen-containing gas into the bed at a point below said feed locus whereby a major part of the liquid portion of feed mixture flows countercurrent to said gas flow and the vapor portion flows con-current to said gas flow; removing from the upper end of the bed at a point above said feed locus a gaseous stream comprising hydrogen and vaporized portions of said mixture; and removing from the lower end of the bed a liquid stream comprising the hydrogenated product.

Thus, the present invention is based on the improvement which comprises having countercurrent contact between the liquid phase hydrocarbon to be hydrogenated and the hydrogen with simultaneous contact in the vapor phase between a portion of the hydrocarbon to be hydrogenated and hydrogen gas. In this manner hydrogenating efficiency is significantly increased over that obtainable from prior art processes.

With reference to FIGURE 1, the invention may be practiced by introducing hydrocarbon oil via line 10 into catalytic hydrogenator 11. A portion of the feed is passed downwardly in primarily liquid phase through the catalyst bed in countercurrent contact with a hydrogen-containing gas which had been introduced into the lower end of the catalyst bed via line 12. It is noted that the feed inlet line 10 is at a locus intermediate the ends of the bed, for example, between the locus of line 14 and 12.

By careful control of the hydrogenating conditions with respect to temperature and hydrogen flow rate, the amount of feed which is vaporized can be regulated accordingly. The vaporized portions of the feed and any vaporized reaction products are passed upwardly through the catalyst bed in con-current flow with the hydrogen-containing gas which had been introduced via line 12. Usually, the amount of overhead vapor product, exclusive of hydrogen, will be from 25% to 95% by volume, based on the feed. Preferably, the amount of overhead vapor product will be from 30% to 85% and, most advantageously, greater than 50% volume based on the feed. Unreacted hydrogen-containing gas, vaporized portions of the hydrocarbon feed mixture, and vaporized hydrogenated products are removed from catalytic hydrogenator 11 via line 14. The liquid portion of the feed which has been subjected to liquid phase hydrogenation in that portion of the catalyst bed below the feed point is removed via line 13, comingled with the total overhead effluent from line 14, and passed into receiver-separator 15 via line 17. The receiver-separator 15 can also act as a condenser for the vaporized overhead effluent. Liquid hydrogenated product is removed from the process via line 16. Separated hydrogen-containing gas is recycled to catalytic hydrogenator 11 via line 12 with fresh hydrogen-containing gas, as needed, being introduced through line 18.

It can be seen from the above description that all of the gaseous material is passed over substantially dry catalyst above the feed point by the upwardly flowing hydrogen gas stream thereby providing maximum hydrocarbon-to-catalyst contact. Additionally, below the feed point, the liquid phase operation is carried out such that the liquid hourly space velocity is reduced due to the hold-up action of the entering hydrogen-containing gas; therefore, the reaction is carried more to completion in the liquid portion. Also, it is noted that in this process scheme the liquid portion of the feed is exposed to the highest purity hydrogen in the system thereby aiding in maximizing the reaction rate.

The feed point into the catalyst bed may be placed at any point according to the desires of those skilled in the art. The actual locus of the feed will depend, for example, on the desired space velocity with respect to the catalyst of each of the gas and liquid streams. Furthermore, the gaseous and liquid streams could be recovered as separate products since it is not necessary to recombine these streams from the reactor. Therefore, it is seen that reactor 11 can be deemed a reactor-fractionator.

Reference is now made to FIGURE 2 for a more detailed illustration of the practice of this invention. In similar fashion, a hydrocarbon feed mixture to be hydrogenated is fed into catalytic hydrogenator 111 at a locus intermediate the ends of the bed. Hydrogen-containing gas is introduced into hydrogenator 111 via line 113. If desired, hydrogen-containing gas can also be introduced into the catalyst bed via line 112 at a locus above the feed point. It is distinctly preferable for hydrogen-containing gas to be introduced into hydrogenator 111 via both lines 112 and 113 as hereinbelow described.

Unreacted hydrogen gas, vaporized portions of the feed mixture, and vaporized portions of the hydrogenated product are removed as a total gaseous stream via line 115. The hydrogenated liquid product is removed from hydrogenator 111 via line 114. At least a portion of the liquid hydrogenated product is recycled using pump 123 via line 116 to the catalyst bed at a point intermediate to the feed locus and the lower end of the bed. Another portion of the liquid hydrogenated product is passed via line 117, in admixture with the gaseous stream in line 115, into receiver-separator 119 via line 122. Hydrogenated product is removed from the process via line 118. The receiver-separator 119 can also act as a condenser to condense the hydrocarbon portion of the vaporized stream which had been recovered through line 115. The unreacted hydrogen-containing gas is recycled to hydrogenator 111 via line 124 using compressor 120 into lines 113 and/or 112 as hereinabove described. Fresh hydrogen-containing gas, as needed, is added to the process via line 125.

Since the hydrogenated product removed from the hydrogenator 111 via line 114 contains a certain amount of dissolved gasses including hydrogen, it may be desirable to remove a small portion of the product as a drag stream via line 121.

It is readily seen from the detailed description given hereinabove for the two embodiments of the present invention, that many improvements over the prior art processes can be realized. For example, the additional hydrogen entry ports in the catalyst bed permits a high partial pressure of hydrogen to be maintained in the vapor phase; thereby providing significant improvement in the hydrogenation of the light ends vaporized from the feed mixture. Furthermore, the recycled hydrocarbon oil in liquid phase to the catalyst bed can be variably adjusted by those skilled in the art to any desired oil-to-catalyst contact ratio; thereby providing excellent flexibility in the control of the quality of the final hydrogenated product. Additional improvements are achieved since the recycle of the liquid products permits careful and accurate temperature control within the catalyst bed and provides a means for adding additional heat to the feed as it moves within the catalyst bed. The liquid recycle also prevents plugging of the bed by providing a liquid wash which carries out of the reactor materials which might precipitate from the liquid. Finally, it was found that the countercurrent flow of hydrogen within the catalyst bed provides an overhead stream of gaseous products which are not contaminated with heavy ends of the feed material; thereby yielding a clean, almost water-white, overhead hydrocarbon product.

The following examples illustrate the invention:

Example I

The charge stock is a hydrocarbon distillate oil having a boiling range of 600° F. to 820° F., a Saybolt Universal viscosity at 100° F. of 100 seconds and at 200° F. of 39 seconds, and an API gravity of 33. The sulfur content is 0.1% and the aromatic content is 12% by weight. The hydrogenation catalyst comprises 12½% cobalt-molybdate on an alumina base. The catalyst bed is disposed in an hydrogenation zone in the manner shown according to FIGURE 2 and the charge stock and hydrogen are introduced into catalyst bed in the manner illustrated in FIGURE 2.

Pressure in hydrogenator 111 is 800 p.s.i.g. and the charge stock is passed through hydrogenator 111 at a liquid hourly space velocity of 1 based on the entire catalyst content of the vessel. The charge stock is preheated to 675° F. and introduced into hydrogenator 111 in the manner indicated. Hydrogen-containing gas is introduced at a temperature of 225° F. via lines 112 and 113 in substantially equal amounts in each line.

A hydrogenated liquid product having substantially reduced sulfur and substantially reduced aromatics content is removed from the process via line 118. The gaseous products are removed overhead via line 115 at a temperature of approximately 400° F. The hydrogen gas recycled from receiver-separator 119 has been cooled to approximately 225° F., and is pumped by compressor 120 at a rate of about 1200 standard cubic feet per barrel of charge.

By operating in the manner illustrated, it was found that the catalyst deactivation rate, by utilizing the combined liquid phase and vapor phase reactions, was substantially less than that obtained from practicing the prior art process on similar feed stocks. The improved results in aromatics removal and sulfur removal were noticed by an increased hydrogen-to-carbon ratio and a significantly decreased refractive index of the product over the feed stock.

In the above example, the hydrogenation of constituents of the distillate oil resulted in a prouct which, when inhibited against oxidation by the addition of a small amount, e.g. 0.5% of an oxidation inhibitor such as 2,6-dietertiary butyl p-cresol, had greater oxidation stability than that of the charge stock containing the same amount of the same inhibitor, and had improved oxidation stability over those hydrogenated products of the prior art processes.

Example II

A crude oil having the following properties was processed over a cobalt-molybdate hydrogenation catalyst [1] according to the flow scheme shown in FIGURE 2:

| | |
|---|---|
| Gravity, °API at 60° F | 20.3 |
| Specific Gravity, at 60° F | 0.9321 |
| Total sulfur, wt percent | 4.24 |
| Nitrogen content, wt. percent | 0.20 |
| Conradson carbon residue, wt. percent | 10.02 |
| Viscosities: | |
| Kinematic at 100° F., cst | 83.93 |
| Universal at 100° F., secs | 389 |

| 100 ml. distillation: | F-1 Engler | Vacuum Engler |
|---|---|---|
| IBP | 204 | 203 |
| 5% | 294 | 294 |
| 10% | 344 | 344 |
| 30% | 572 | 620 |
| 50% | 667 | 809 |
| 70% | 695 | 905 (60%) |
| 90% | 716 (80%) | |
| 95% | | |
| Percent recovered | 88.5 | 67.0 |
| Percent bottoms | | 33.0 |
| Percent loss | 0.3 | 1.0 |
| Percent coke, by weight | 11.2 | |

The following results were obtained from a series of runs whereby the amount of feed ultimately vaporized was varied:

| | Run No. | | | | |
|---|---|---|---|---|---|
| | 1 | 2 | 3 | 4 | 5 |
| Reactor temperature, °F.: | | | | | |
| Top | 780 | 780 | 782 | 778 | 800 |
| Middle | 760 | 764 | 768 | 767 | 790 |
| Bottom | 760 | 758 | 762 | 760 | 782 |
| H₂ recycle rate, s.c.f./b.: | | | | | |
| Vapor phase portion | 10,180 | 14,050 | 15,250 | 18,450 | 15,810 |
| Liquid phase portion | 3,520 | 3,510 | 5,310 | 12,640 | 10,810 |
| N₂ in bottoms product, p.p.m | 2,270 | 2,350 | 2,410 | 2,660 | 2,870 |
| N₂ in overhead product, p.p.m | 10.9 | 6.1 | 11.9 | 24.3 | 559 |
| Total blended product: [2] | | | | | |
| Gravity, API at 60° F | 25.8 | 26.6 | 28.6 | 30.2 | 32.0 |
| Total N₂, p.p.m | 1,668 | 1,658 | 1,453 | 1,239 | 894 |
| Total S, wt. percent | 1.8 | 1.62 | 1.36 | 0.72 | |
| Volume percent vaporized | 30.0 | 33.0 | 43.0 | 61.5 | 86.5 |

[1] 2.2% cobalt; 5.7% Molybdenum on alumina.
[2] Crude untreated product properties: Gravity, 20.3; total N₂, 2,000; total S, 4.24%.

It is evident from the above data that the two major factors affecting the percent of crude vaporized are reactor temperature and hydrogen recycle rate in the liquid phase portion of the reactor. An increase in hydrogen recycle of 2,000 s.c.f./b. increased vaporization 10%, and an increase of 5,000 s.c.f./b. increased vaporization almost 20%. An increase in reactor temperature of 20° F. increased vaporization an additional 25%. Thus, excellent flexibility and efficiency of operation can be achieved by varying the mode of operating this invention. For example, if it is desired, 92% nitrogen removal and 96% sulfur removal could be achieved by vaporizing the feed such that 96% to 98% by volume of the feed was taken overhead as a vapor phase product stream.

The process of this invention is suitable for any process involving the contacting of hydrogen and liquid hydrocarbon. Thus, for example, lubricating oils can be decolorized and/or desulfurized; unsaturated aliphatic or aromatic constituents in gasoline may be saturated; linseed oils can be converted to a solid; the hydrocarbons $C_{17}H_{32}$ and $C_{17}H_{30}$ can be converted to heptadecane; the ethyl ester of linoleic acid can be converted to the ethyl ester of stearic acid; residual petroleum oil can be converted to lower boiling range products and/or contaminants therein can be reduced; etc.

The operating conditions for the hydrogenating reaction are known to those skilled in the art. For example, the desulfurization of lubricating oils, e.g. those boiling between 400° F. and 800° F., is performed at temperatures ranging from 400° F. to 1000° F. and pressures from 150 p.s.i.g. to 10,000 p.s.i.g. On the other hand the hardening of vegetable and marine oils is performed at temperatures ranging from 100° F. to 400° F. at only slightly elevated pressures, e.g. 50 to 150 p.s.i.g. Liquid hourly space velocities in each case may vary from 0.1 to 20. Those skilled in the art known how to choose the proper operating conditions according to the components in the system.

Furthermore, as used herein, the term "hydrogen-containing gas" is intended to embody hydrogen, water gas, or other commercial gas mixtures containing hydrogen. Usually, the gas mixture will contain at least 40% hydrogen by weight.

Any suitable granular solid hydrogenating catalyst can be employed in the process according to the invention, e.g. cobalt, molybdenum, platinum, iron, nickel, oxides, or sulfides of such metals, etc. Conventional carriers of the catalyst can also be employed, e.g. silica gel, alumina, bauxite, clay, activated carbon, etc.

The invention claimed:

1. Process for hydrogenating constituents of hydrocarbon mixtures which comprises:
   (a) introducing a hydrocarbon feed mixture into a bed of granular solid hydrogenating catalyst under hydrogenating conditions at a locus intermediate the ends of said bed;
   (b) passing a portion of the hydrocarbon mixture downwardly in primarily liquid phase through a first section of said bed below the feed locus;
   (c) passing the remainder of said mixture upwardly in primarily vapor phase through a second section of said bed above the locus under conditions sufficient to maintain the catalyst in said second section in substantially dry condition;
   (d) passing hydrogen-containing gas into the bed at a point below said feed locus whereby a major part of the liquid portion of said mixture flows countercurrent to the gas flow and the vapor portion flows concurrent to said gas flow;
   (e) removing from the upper end of the bed at a point above said feed locus a gaseous stream comprising hydrogen and vaporized portions of said mixture;
   (f) removing from the lower end of the bed a liquid stream comprising the hydrogenated product;
   (g) recycling a portion of said liquid stream of step (f) to said first section of the catalyst bed at a point intermediate the feed locus and the lower end of the bed; and,
   (h) admixing said gaseous stream of step (e) and the remaining portion of said liquid stream of step (f) under conditions sufficient to produce a hydrogen-containing stream suitable for resuse in step (d) and a product stream comprising hydrogenated hydrocarbons.

2. Process according to claim 1 wherein the hydrocarbon mixture is a petroleum feed stock and said conditions include pressure in the bed in the range from 100 to 10,000 p.s.i.g., the temperature in the bed in the range from 100° F. to 1,000° F., and the liquid hourly space velocity in said bed below the feed locus in the range from 0.1 to 20 volumes per volume per hour.

3. Process according to claim 1 wherein additional hydrogen-containing gas is introduced into the bed at a point intermediate the feed locus and said upper end of the bed whereby the vapor portion of step (c) flows concurrently with the flow of said additional gas.

References Cited

UNITED STATES PATENTS

| | | | |
|---|---|---|---|
| 2,608,521 | 8/1952 | Hoog | 208—213 |
| 2,844,517 | 7/1958 | Inwood | 208—80 |
| 3,296,118 | 1/1967 | Czajkowski et al. | 208—138 |
| 3,124,526 | 3/1964 | Butler et al. | 208—216 |
| 3,147,210 | 9/1964 | Haas et al. | 208—216 |

HERBERT LEVINE, Primary Examiner

U.S. Cl. X.R.

208—101